US012442259B1

(12) United States Patent
Jones et al.

(10) Patent No.: US 12,442,259 B1
(45) Date of Patent: Oct. 14, 2025

(54) POSITIONING SYSTEM FOR BLAST HOLE DRILLING OPERATIONS

(71) Applicant: Caterpillar Global Mining Equipment LLC, Denison, TX (US)

(72) Inventors: Isaac A Jones, Mackinaw, IL (US); Christopher R. Beasley, Peoria, IL (US); Matthew Meredith Noble, Gainesville, TX (US)

(73) Assignee: Caterpillar Global Mining Equipment LLC, Denison, TX (US)

( * ) Notice: Subject to any disclaimer, the term of this patent is extended or adjusted under 35 U.S.C. 154(b) by 0 days.

(21) Appl. No.: 18/974,063

(22) Filed: Dec. 9, 2024

(51) Int. Cl.
*E21B 19/24* (2006.01)
*B25J 11/00* (2006.01)
*E21B 19/02* (2006.01)

(52) U.S. Cl.
CPC ............. *E21B 19/02* (2013.01); *B25J 11/005* (2013.01); *E21B 19/24* (2013.01)

(58) Field of Classification Search
CPC .......... E21B 19/16; E21B 19/24; E21B 19/14; E21B 19/20; E21B 19/00
See application file for complete search history.

(56) References Cited

U.S. PATENT DOCUMENTS 2,828,024 A * 3/1958 True ........................ E21B 19/14 414/22.51
3,500,708 A * 3/1970 Hart ...................... E21B 19/163 81/57.35
3,533,516 A * 10/1970 William .................. E21B 19/14 414/745.2
4,023,449 A 5/1977 Boyadjieff
4,440,536 A * 4/1984 Scaggs .................... E21B 19/20 414/800
4,643,624 A * 2/1987 Murphree ............... E21B 19/14 175/85
4,854,400 A * 8/1989 Simpson ............... E21B 15/003 414/22.58
5,595,248 A * 1/1997 Denny .................... E21B 19/24 166/85.5
5,609,457 A * 3/1997 Burns ..................... E21B 19/24 175/85
5,791,206 A 8/1998 Daigle et al.
6,220,807 B1 * 4/2001 Sorokan ................ E21B 19/155 414/22.55
6,298,926 B1 * 10/2001 Dalkert ................. E21B 19/167 175/85
7,090,254 B1 * 8/2006 Pietras .................... E21B 19/16 166/380

(Continued)

*Primary Examiner* — Kipp C Wallace

(57) ABSTRACT

A method and system for capturing and aligning a drill pipe of a surface drill includes a first arm assembly and a second arm assembly. Each arm assembly features an end effector coupled to a position adjustment mechanism configured to receive a plurality of shims for positional adjustments relative to the drill pipe. The end effectors include ramp features and elongate fingers forming ends of the effectors. The arm assemblies are arranged at an obtuse angle to each other, creating a receptacle for the drill pipe. The method includes positioning the arm assemblies on a mast, actuating them upward and inward, engaging the drill pipe with the elongate fingers, guiding the drill pipe along the ramp features, and capturing the drill pipe in the receptacle formed by the end effectors.

20 Claims, 5 Drawing Sheets

(56) References Cited

U.S. PATENT DOCUMENTS

| | | | | |
|---|---|---|---|---|
| 7,546,882 | B2 * | 6/2009 | Hollingsworth, Jr. | E21B 19/16 166/380 |
| 9,073,732 | B2 * | 7/2015 | LaValley | B66C 1/44 |
| 9,085,944 | B2 | 7/2015 | Lavalley et al. | |
| 9,702,199 | B2 * | 7/2017 | Korf | E21B 17/006 |
| 10,280,697 | B2 * | 5/2019 | Wright | E21B 19/24 |
| 11,085,250 | B2 * | 8/2021 | Søyland | E21B 19/16 |
| 11,208,857 | B2 | 12/2021 | Soyland | |
| 11,814,911 | B2 | 11/2023 | Saunders et al. | |
| 2013/0146364 | A1 * | 6/2013 | Rowling | F16C 35/02 175/220 |
| 2013/0306378 | A1 * | 11/2013 | Ledbetter | E21B 7/02 175/85 |
| 2015/0075814 | A1 * | 3/2015 | Gerwing | E21B 19/14 166/77.51 |
| 2018/0245408 | A1 * | 8/2018 | Keogh | B25J 9/1065 |
| 2019/0186211 | A1 * | 6/2019 | Gonzalez Gonzalez | E21B 15/003 |

* cited by examiner

POSITIONING SYSTEM FOR BLAST HOLE DRILLING OPERATIONS

TECHNICAL FIELD

The present application relates generally to blast hole drilling operations. More particularly, the present application relates to a system that can be used to capture and position a drill pipe during hole drilling operations.

BACKGROUND

Surface rock drills are used for open pit mining operations where blast holes are drilled, filled with explosive and fractured. This reduces the size of the ore to the correct size for further processing and establishes the bench height for the next level of the mine. Blast hole drilling involves the use of specialized rigs that create holes by fracturing rock using drill bit rotation combined with either percussive impacts or high bit pressure. Many rigs are capable of both methods, and both require positioning the drill pipe for various machine functions.

Various systems have been developed for capturing and positioning the drill pipe for drilling. U.S. Pat. Nos. 11,085,250B2, 9,085,944B2 and 11,208,857B2 describe apparatuses for gripping drill pipes in a drill string. However, these patents utilize end effectors and other components and features that differ from the assemblies and system discussed herein.

SUMMARY OF THE INVENTION

In one example, a system for capturing and aligning a drill pipe of a surface drill is disclosed. The system can optionally include: a first arm assembly having a first end effector coupled to a first position adjustment mechanism and a second arm assembly having a second end effector coupled to a second position adjustment mechanism. The first position adjustment mechanism can be configured to receive a plurality of shims to adjust a position of the first end effector relative to the drill pipe. The first end effector can include at least a first ramp feature and a first elongate finger forming an end of the first end effector. The second position adjustment mechanism can be configured to receive the plurality of shims to adjust a position of the second end effector relative to the drill pipe. The second end effector can include at least a second ramp feature and a second elongate finger forming an end of the second end effector. The first arm assembly and the second arm assembly can be configured to be arranged at an obtuse angle to one another about the drill pipe such that the first end effector and the second end effector form a receptacle for the drill pipe. The receptacle is partially formed by the first elongate finger and the second elongate finger.

In another example, a method of capturing and positioning a drill pipe of a surface drill is disclosed. The method can include: positioning a first arm assembly and a second arm assembly on a mast about the drill pipe, actuating the first arm assembly and the second arm assembly upward and inward, engaging the drill pipe with a first elongate finger of a first end effector of the first arm assembly and a second elongate finger of a second end effector of the second arm assembly, guiding the drill pipe along at least a first ramp feature of the first end effector positioned inward of the first elongate finger, guiding the drill pipe along at least a second ramp feature of the second end effector positioned inward of the second elongate finger, and capturing the drill pipe in a receptacle formed by the first end effector and the second end effector.

In yet another example, an assembly for capturing and positioning a drill pipe of a surface drill is disclosed. The assembly can include: a base; an actuation mechanism pivotally coupled to the base and a first arm assembly. The first arm assembly can include: a linkage pivotally coupled to the actuation mechanism, a position adjustment mechanism coupled to the linkage and configured to receive a plurality of shims, and an end effector coupled to the position adjustment mechanism and positioned relative to the drill pipe thereby. The end effector includes at least a first curved member and a second curved member configured to function as ramps upon engagement with the drill pipe. The end effector forms an inner edge that has an arcuate curvature and extends between and spaces apart the first curved member and the second curved member.

DETAILED DESCRIPTION

Figure 1:
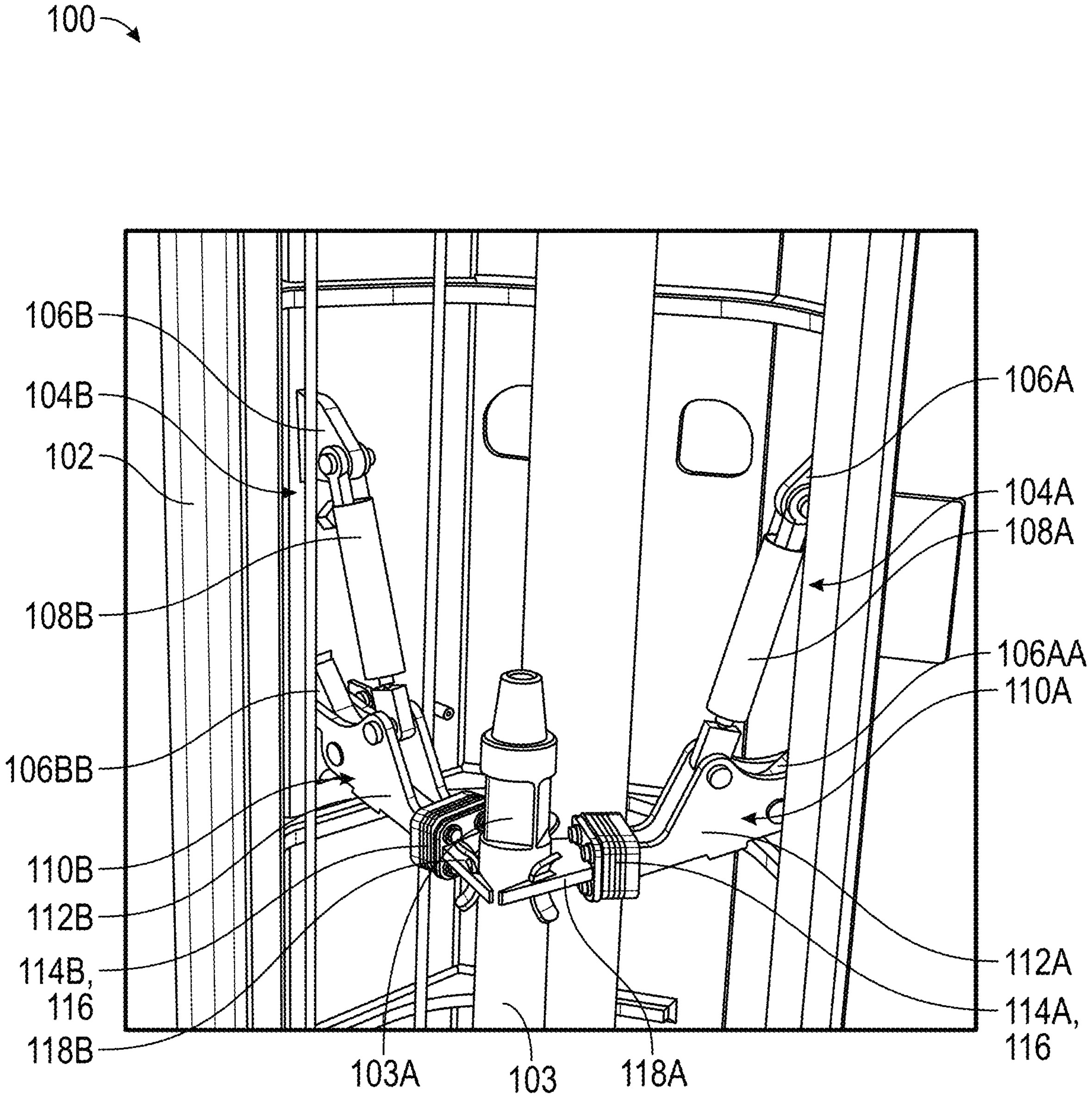
FIG. 1 shows a perspective view of a system for capturing and aligning a drill pipe for surface blast hole drilling according to an example of the present application.

FIG. 1 shows a system 100 that can be used for surface blast hole drilling operations that employ a mast 102 and a drill pipe 103. The system 100 can capture and position the drill pipe 103 relative to the mast 102 as illustrated in FIG. 1. The system 100 can include a first assembly 104A and a second assembly 104B. The first assembly 104A can include a first base 106A, a second base 106AA, a first actuation mechanism 108A and a first arm assembly 110A. The second assembly 104B can include a third base 106B and a fourth base 106BB, a second actuation mechanism 108B and a second arm assembly 110B. The first arm assembly 110A can include a first linkage 112A, a first position adjustment mechanism 114A with a plurality of shims 116 and a first end effector 118A. The second arm assembly 110B can include a second linkage 112B, a second position adjustment mechanism 114B with the plurality of shims 116 and a second end effector 118B.

The mast 102 can serve as the outer containment housing for the various components of the system 100. The mast 102 can be open on one side and closed on another side. The mast 102 can provide structural support and stability for the system 100 during drilling operation. The drill pipe 103, which includes pipe flats 103A, can be captured, engaged and positioned by the system 100 relative to the mast 102. The pipe flats 103A can be relatively flatter areas on the drill pipe 103. The pipe flats 103A can be used for various purposes including for storage, handling and can be used for loosening/tightening pipe sections to lengthen or shorten the drills string. The system 100 can be configured to handle the drill pipe 103. This handling can occur at or adjacent the pipe flats 103A according to some examples or can be spaced from the pipe flats 103A according to other examples. The system 100 can aid in proper alignment and positioning of the drill pipe 103 during drilling operations as further discussed subsequently. According to further examples, the system 100 can provide support for the drill string when starting a hole or drilling a hole that is not vertical during angle drilling.

The first base 106A, the second base 106AA, the third base 106B and the fourth base 106BB can be features such as flanges, anchoring elements or other coupling components of the mast 102. The first base 106A, the second base 106AA, the third base 106B and the fourth base 106BB can provide foundational support for the respective assemblies and are mounted within the mast 102. The first base 106A can be pivotally connected to a first end of the first actuation mechanism 108A. The third base 106B can be pivotally connected to a first end of the second actuation mechanism 108B. The second base 106AA can be pivotally connected to a first end of the first arm assembly 110A at a first end of the first linkage 112A. The fourth base 106BB can be pivotally connected to a first end of the second arm assembly 110B at the first end of the second linkage 112B.

The first assembly 104A includes the first actuation mechanism 108A, and the second assembly 104B includes the second actuation mechanism 108B. The first actuation mechanism 108A and the second actuation mechanism 108B can be hydraulic or pneumatic systems including one or more cylinders. The first actuation mechanism 108A and the second actuation mechanism 108B can be capable of pivoting the first arm assembly 110A and the second arm assembly 110B, respectively, relative to the mast 102 for positioning of the first end effector 118A and the second end effector 118B to engage the drill pipe 103. The first actuation mechanism 108A and the second actuation mechanism 108B can provide force to move the first arm assembly 110A and the second arm assembly 110B upward and inward away from the mast 102 toward the drill pipe 103 during operation. The first arm assembly 110A and the second arm assembly 110B can be configured to move in coordination to capture, position and support the drill pipe 103.

The first actuation mechanism 108A can be pivotally connected with the first arm assembly 110A, in particular, at an intermediate portion of the first linkage 112A. The second actuation mechanism 108B can be pivotally connected with the second arm assembly 110B, in particular, at an intermediate portion of the second linkage 112B. The first linkage 112A and the second linkage 112B can be single bar linkages. The first linkage 112A and the second linkage 112B can be connected to the respective actuation first actuation mechanism 108A and the second actuation mechanism 108B and to the mast 102 via the base 106AA and the base 106BB at two separate spaced connections along an elongate length thereof.

The first linkage 112A can connect at an second end with the first position adjustment mechanism 114A. The second linkage 112B can connect at an second end with the second position adjustment mechanism 114B. The first end effector 118A can be jaw or otherwise shaped and can be used in tandem with the second end effector 118B to capture, engage and position the drill pipe 103 as shown in FIG. 1 and further described. The first end effector 118A can couple with the first position adjustment mechanism 114A. The second end effector 118B can couple with the second position adjustment mechanism 114B. The first end effector 118A and the second end effector 118B can be adjustable to alter a positioning of the first end effector 118A and the second end effector 118B, respectively, as further described herein using the plurality of shims 116.

Figure 2A:
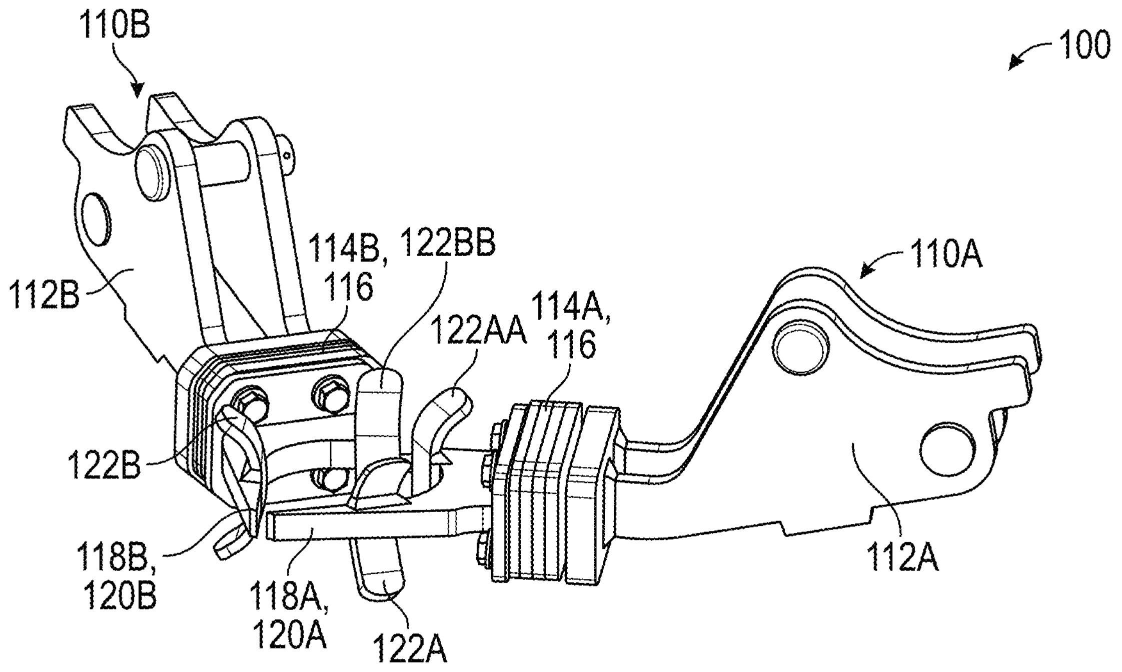
FIG. 2A shows a perspective view of the system of FIG. 1 with components including the drill pipe and mast removed.
Figure 2B:
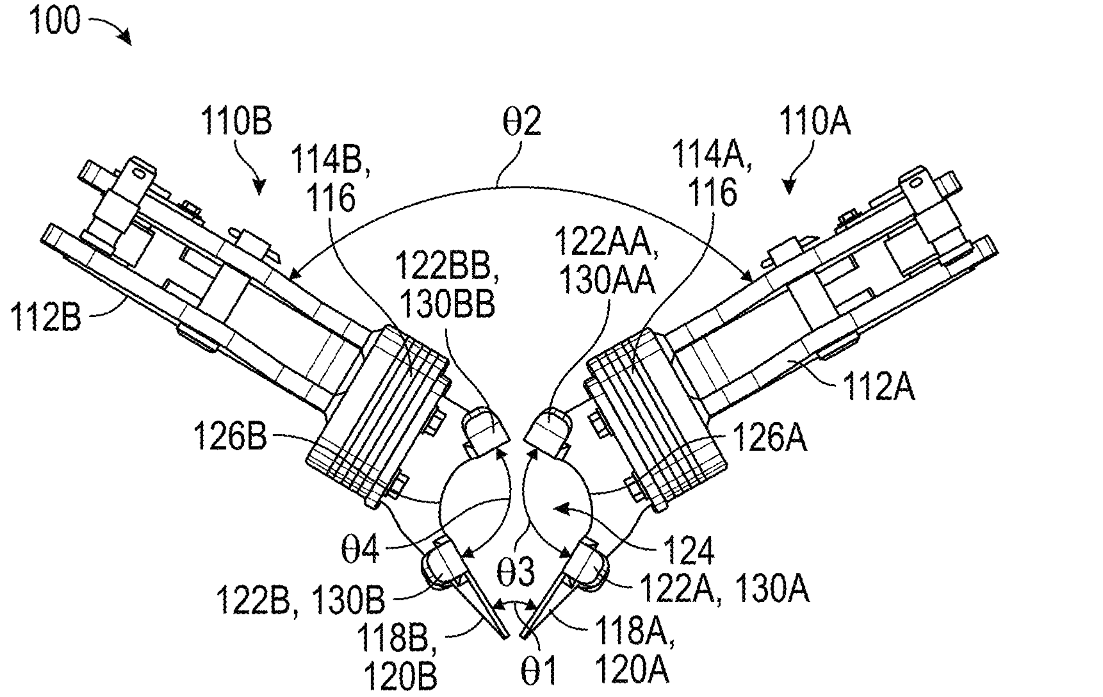
FIG. 2B is a plan view of the system of FIG. 2A.

FIGS. 2A and 2B further illustrate portions of the system 100 including the first arm assembly 110A and the second arm assembly 110B. As illustrate in FIGS. 2A and 2B, the first arm assembly 110A can include the first linkage 112A, the first position adjustment mechanism 114A, the plurality of shims 116 and the first end effector 118A. The second arm assembly 110B can include the second linkage 112B, the second position adjustment mechanism 114B, the plurality of shims 116 and the second end effector 118B. The first end effector 118A can include at least a first ramp feature (e.g., a first ramp feature 122A and a second ramp feature 122AA), and a first elongate finger 120A. The second end effector 118B can include at least a second ramp feature (e.g., a third ramp feature 122B and a fourth ramp feature 122BB) and a second elongate finger 120B.

The first elongate finger 120A can form an end (a furthest tip) of the first end effector 118A. The second elongate finger 120B can form an end (a furthest tip) of the second end effector 118B. The first elongate finger 120A can be arranged to converge toward but can be spaced slightly from the second elongate finger 120B. This converging arrangement can form an angle θ1 of between about 30 and about 80 degrees between the first elongate finger 120A and the second elongate finger 120B as shown in FIG. 2B.

As further shown in FIG. 2B, the first arm assembly 110A and the second arm assembly 110B can be arranged at an angle such as an obtuse angle θ2 to one another about the drill pipe 103 (FIG. 1). This obtuse angle θ2 can be between about 100 degrees and about 140 degrees. This arrangement and the shape of the first end effector 118A and the second end effector 118B allows the first end effector 118A and the second end effector 118B to engage at least 240 degrees of a circumference of the drill pipe 103. Additionally, first end effector 118A and the second end effector 118B form a receptacle 124 for the drill pipe 103. The receptacle 124 is non-circular and non-fully enclosed. The receptacle 124 is partially formed by the first elongate finger 120A and the second elongate finger 120B, which converge toward but are spaced from each other, forming the angle θ1 discussed previously.

As shown in FIG. 2B, the first ramp feature 122A can be a first curved member 130A. Similarly, the second ramp feature 122AA can be a second curved member 130AA. The first end effector 118A forms an inner edge 126A that has an arcuate curvature for a portion of the extent thereof. In particular, the arcuate curvature of the inner edge 126A extends between and spaces apart the first curved member 130A and the second curved member 130AA. The first curved member 130A and the second curved member

130AA can be similarly or differently shaped. For example, the first curved member 130A and the second curved member 130AA can each have an intermediate portion that forms a part of the inner edge 126A and each can include first ends and second ends positioned outward of the inner edge 126A.

The third ramp feature 122B and the fourth ramp feature 122BB of the second end effector 118B can be shaped as a third curved member 130B and a fourth curved member 130BB. The third curved member 130B and the fourth curved member 130BB can be similarly or differently shaped. The second end effector 118B forms a second inner edge 126B that has an arcuate curvature for a portion thereof. This arcuate curvature of the second inner edge 126B extends between and spaces apart the third curved member 130B and the fourth curved member 130BB. As an example, the third curved member 130B and the fourth curved member 130BB each can have an intermediate portion that forms a part of the second inner edge 126B and each can include first and second ends positioned outward of the second inner edge 126B.

The second curved member 130AA can be positioned at a second end of the first end effector 118A opposite the first elongate finger 120A. The fourth curved member 130BB can be positioned at a second end of the second end effector 118B opposite the second elongate finger 120B. The first curved member 130A is positioned adjacent the first elongate finger 120A, and the third curved member 130B can be positioned adjacent the second elongate finger 120B. The first end effector 118A and the second end effector 118B can be arranged/configured with a mirror symmetry about the drill pipe 103 (see FIGS. 1, 7A and 7B) and can be configured to engage the drill pipe 103. Together the second curved member 130AA, the inner edge 126A, the first curved member 130A and the first elongate finger 120A can form a first side of the receptacle 124. The second side of the receptacle 124 can be formed by the fourth curved member 130BB, the second inner edge 126B, the third curved member 130B and the second elongate finger 120B.

As further shown in FIG. 2B, the first curved member 130A can be positioned at an angle θ1 of between about 95 degrees and about 145 degrees with the second curved member 130AA. The third curved member 130B can be positioned at an angle θ4 of between about 95 degrees and about 145 degrees with the fourth curved member 130BB.

Figure 3:
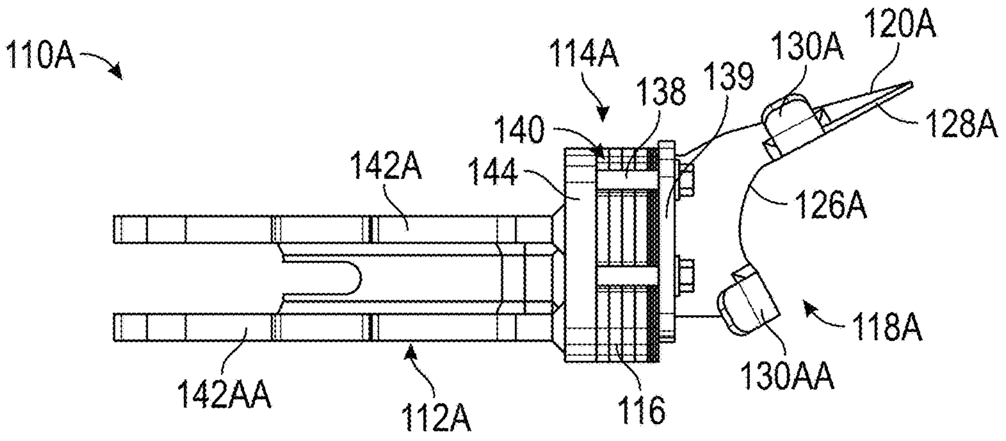
FIG. 3 is a plan view of a first arm assembly of the system of FIGS. 1-2B including a first linkage, a first position adjustment mechanism and a first end effector according to an example of the present application.

FIG. 3 shows the first arm assembly 110A. The first arm assembly 110A includes the first linkage 112A, the first position adjustment mechanism 114A, the plurality of shims 116, the first end effector 118A with the inner edge 126A and the first elongate finger 120A.

The first linkage 112A includes a first plate 142A and a second plate 142AA. The first plate 142A and a second plate 142AA can be arranged substantially parallel to one another. The first position adjustment mechanism 114A can be coupled to the second end of the first linkage 112A. The first position adjustment mechanism 114A can include an end plate 144, the plurality of shims 116 and an end plate 139 (second end plate). The end plate 144 can be formed by or otherwise connected to the first linkage 112A according to some examples. The end plate 144 can provide a mounting component or base for the plurality of shims 116.

Figure 7A:
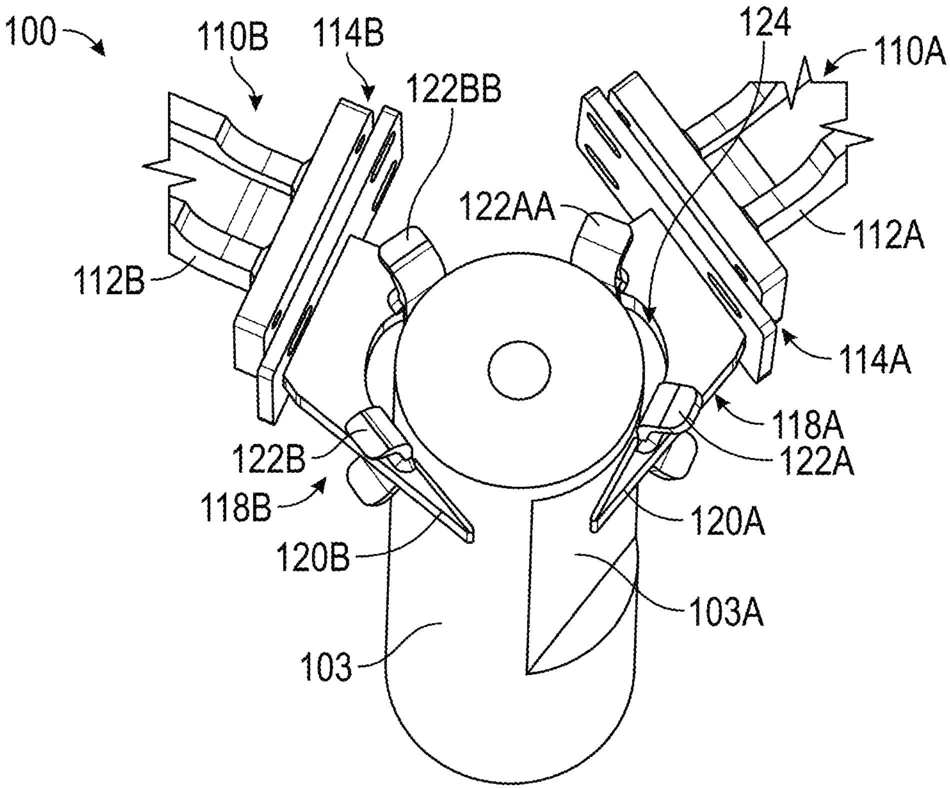
FIG. 7A is a perspective view of the system for capturing and aligning the drill pipe capturing and positioning the drill pipe of a first diameter according to an example of the present application.
Figure 7B:
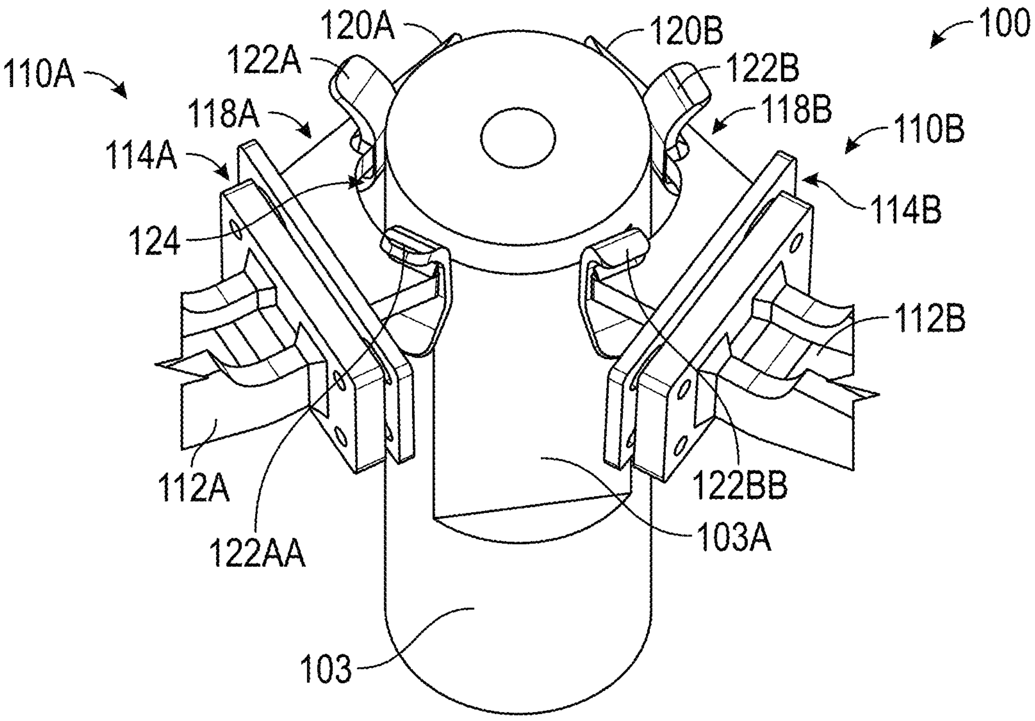
FIG. 7B is another perspective view of the system of FIG. 7A.

The first position adjustment mechanism 114A also includes fasteners 138 (shown in FIG. 3 but not shown in some of the other of the FIGURES) that extend through the first position adjustment mechanism 114A having heads that rest against the end plate 139. The fasteners 138 are received in apertures 140. The fasteners 138 can couple together the end plate 144, the plurality of shims 116 and the end plate 139. The apertures 140 (e.g., holes, slots, etc.) can be formed by the end plate 144, the end plate 139 and by one or more of the plurality of shims 116. The apertures 140 can be configured to allow for the insertion and removal of the plurality of shims 116. This configuration allows for the adjustment of the position of the first end effector 118A relative to the drill pipe 103 (FIGS. 1, 7A and 7B). In particular, the plurality of shims 116 can be inserted or removed to accommodate different diameters of the drill pipe 103 (FIGS. 1, 7A and 7B), facilitating the handling of various pipe diameters without the need to change the first end effector 118A.

FIG. 3 additionally shows the inner edge 126A of the first end effector 118A can be formed by the combination of the first curved member 130A, the arcuate portion extending between the first curved member 130A and the second curved member 130AA and the first elongate finger 120A. The inner edge 126A can be at least partially formed by a chamfer 128A. This chamfer 128A can extend along the inner edge 126A for part of an substantially an entire extent of the first elongate finger 120A. Chamfer 128A can extend to other portions of the first end effector 118A. As further shown in FIG. 3, the first elongate finger 120A does not include a curvature along the inner edge 126A and chamfer 128A but instead extends outward in a generally straight-line manner from the first curved member 130A. Thus, the first elongate finger 120A does not curve back toward the first curved member 130A or the second curved member 130AA.

Figure 4:
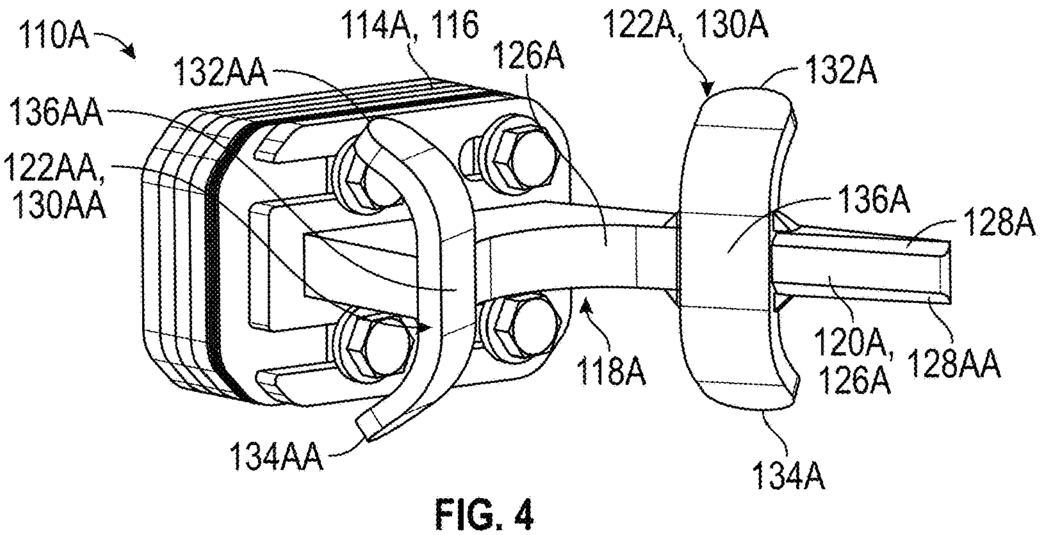
FIG. 4 is a perspective vie of a portion of the first arm assembly of FIG. 3 further illustrating components of the first end effector according to an example of the present application.

FIG. 4 illustrates a portion of the first arm assembly 110A, which includes the first position adjustment mechanism 114A, the plurality of shims 116 and the first end effector 118A. The first end effector 118A can include the first elongate finger 120A, the first ramp feature 122A, the second ramp feature 122AA, the inner edge 126A, the chamfer 128A, the first curved member 130A and the second curved member 130AA as previously discussed. In some examples, a second chamfer 128AA can be provided for on a second side of the inner edge 126A opposing the chamfer 128A.

FIG. 4 additionally shows the first curved member 130A can include a first end 132A, a second end 134A and an intermediate portion 136A. Similarly, the second curved member 130AA can include the first end 132AA, the second end 134AA and an intermediate portion 136AA.

As shown in FIG. 4, the first curved member 130A can be joined by welding or other suitable methods and can be formed from a bent or curved metal or other suitable material. The second curved member 130AA can be similarly joined to the remainder of the first end effector 118A and can be formed from a bent or curved metal or other suitable material. The first curved member 130A and the second curved member 130AA each have the intermediate portion 136A and 136AA, respectively, that forms a part of the inner edge 126A. The first curved member 130A and the second curved member 130AA each include first ends 132A and 132AA, respectively, and second ends 134A and 134AA, respectively, positioned outward of the inner edge 126A (forming a larger initial receptacle for engagement) due to the curvature of the first curved member 130A and the second curved member 130AA.

The first end effector 118A can utilize the first elongate finger 120A, the first ramp feature 122A, and the second ramp feature 122AA. The first elongate finger 120A forms an end of the first end effector 118A and is designed to initially engage and the drill pipe 103 (FIGS. 1, 7A and 7B). The first ramp feature 122A and the second ramp feature 122AA are positioned inward of the first elongate finger 120A and are configured to aid in guiding the drill pipe 103 into the receptacle 124 formed by the first end effector 118A and the second end effector 118B.

Figure 5A:
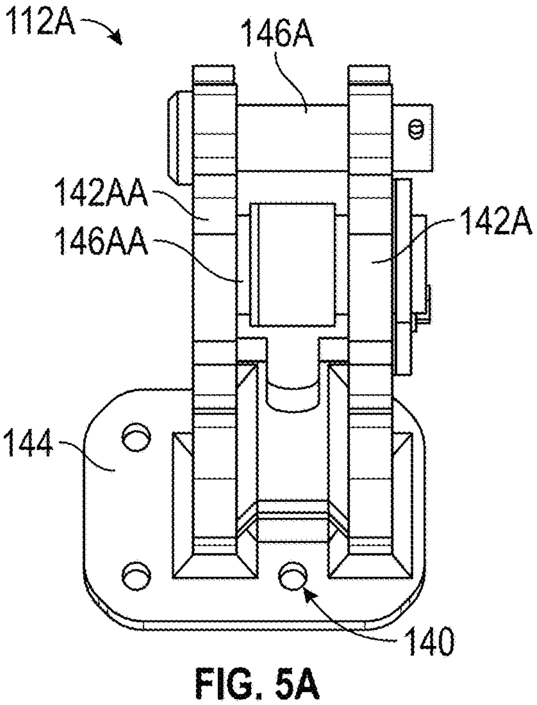
FIG. 5A is a plan view of a first side of the first linkage according to an example of the present application.
Figure 5B:
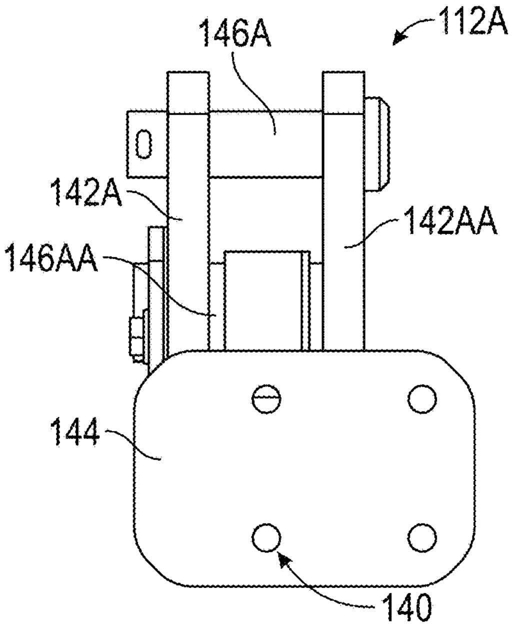
FIG. 5B is a plan view of a second side of the first linkage of FIG. 5A.

FIGS. 5A and 5B illustrate the first linkage 112A, which includes the first plate 142A and the second plate 142AA. The first plate 142A and the second plate 142AA can be arranged substantially parallel to one another and provide structural support to a reminder of the first arm assembly. The first plate 142A and the second plate 142AA can be spaced apart to accommodate other components such as portions of the first actuation mechanism 108A (FIG. 1) and/or base 106AA (FIG. 1). The first plate 142A and second plate 142AA make the first linkage 112A robust capable of being actuated and used to capture and retain the drill pipe 103 (FIGS. 1, 7A and 7B).

The first linkage 112A can connected to the first actuation mechanism 108A (not show) and has two other connections along an elongate length thereof. The first linkage 112A is coupled to a first pin 146A (a pivotal connection point with the base 106AA (FIG. 1)) at an end thereof. At an intermediate portion the first linkage 112A is coupled to a second pin 146AA (a pivotal connection point with the first actuation mechanism 108A (FIG. 1)).

The first linkage 112A includes the apertures 140 formed by the end plate 144, which are configured to receive fasteners 138 (FIG. 3) that extend through the first position adjustment mechanism 114A (FIG. 3), having heads that rest against the end plate 139.

Figure 6:
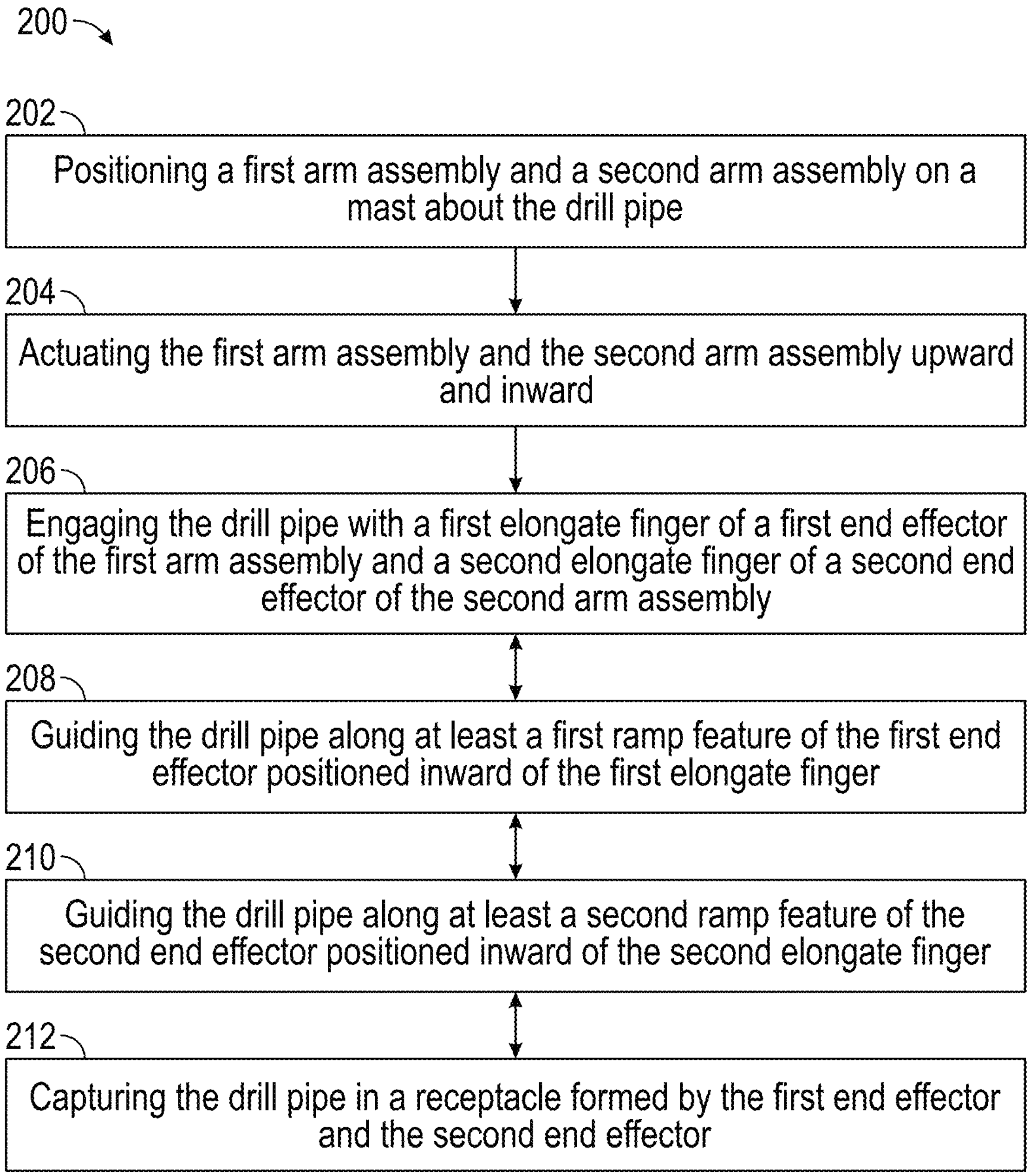
FIG. 6 is a flow chart of a method of capturing and positioning a drill pipe of a surface drill according to one example of the present application.

FIG. 6 illustrates a method 200 of capturing and positioning a drill pipe of a surface drill optionally using the system 100 discussed previously. The method 200 can include positioning 202 a first arm assembly and a second arm assembly on a mast about the drill pipe. The method 200 can include actuating 204 the first arm assembly and the second arm assembly upward and inward and engaging 206 the drill pipe with a first elongate finger of a first end effector of the first arm assembly and a second elongate finger of a second end effector of the second arm assembly. The method 200 can optionally include guiding 208 the drill pipe along at least a first ramp feature of the first end effector positioned inward of the first elongate finger and guiding 210 the drill pipe along at least a second ramp feature of the second end effector positioned inward of the second elongate finger. The method 200 can include capturing 212 the drill pipe in a receptacle formed by the first end effector and the second end effector.

According to some examples the first arm assembly and the second arm assembly can be actuated independently or together such that the actuating 204 the first arm assembly and the second arm assembly upward and inward can occur in tandem or sequence. It should be noted that in some cases the steps 206-212 are entirely optional and may occur in any sequence or some of the individual steps 206-212 may not occur at all (e.g., if the drill pipe is positioned well enough (aligned as desired) to start, the first and second elongate fingers may not touch the drill pipe, simply pass cleanly by, conversely, if the drill pipe is positioned initial too far into the closed side of the mast, the motion of the first arm assembly and the second arm assembly can push the drill pipe forward and center it without use of the first and second elongate fingers and/or the first ramp and/or the second ramp may not be contacted if drill pipe is positioned well enough (aligned as desired) to start).

The method 200 can optionally further include adjusting a position of the first end effector and the second end effector using one or more of a plurality of shims based on a diameter of the drill pipe. In some examples, the engaging the drill pipe with the first elongate finger of the first end effector of the first arm assembly and the second elongate finger of the second end effector of the second arm assembly includes engaging the drill pipe along a chamfered edge of the first elongate finger and along a chamfered edge of the second elongate finger. In some examples, engaging the drill pipe with the first elongate finger of the first end effector of the first arm assembly and the second elongate finger of the second end effector of the second arm assembly includes engaging the drill pipe with the first elongate finger and the second elongate finger before a full articulation of the first arm assembly and the second arm assembly upward and inward and prior to guiding the drill pipe along at least the first ramp feature and guiding the drill pipe along at least the second ramp feature. Capturing the drill pipe in the receptacle can include engaging at least 240 degrees of a circumference of the drill pipe, and further can include accommodating a misalignment of the drill pipe relative to the mast through a converging arrangement of the first elongate finger with the second elongate finger and a mirror symmetry of the first end effector and the second end effector. In some examples, guiding the drill pipe along the at least the first ramp feature can include engaging the drill pipe with a first curved member and a second curved member of the first end effector. The first curved member can be positioned at an angle of between about 95 degrees and about 145 degrees with the second curved member. The guiding the drill pipe can include engaging the drill pipe with at least a third curved member and a fourth curved member. The third curved member can be positioned at an angle of between about 95 degrees and about 145 degrees with the fourth curved member.

INDUSTRIAL APPLICABILITY

Although effective, traditional pipe capturing and positioning systems for a surface drill face challenges that may impact drilling operations and equipment reliability. One such challenge arises from the design of drill pipes themselves. Many drill pipes employ pipe flats 103A (FIGS. 1, 7A and 7B), which are specialized areas on a drill seal designed for wrench engagement to break or make connections. These pipe flats 103A (FIGS. 1, 7A and 7B) may on occasion catch on traditional cup-style or other shaped positioning end effectors, leading to equipment damage. More particularly, the shape of the end effectors combined with the pipe flats, creates a possibility of snagging and interference with pipe flats. This can result in higher than desired replacement rates for positioning assembly components.

Additionally, traditional systems may struggle with achieving proper drill pipe alignment in some operational conditions. For example, machine not perfectly level due to underfoot conditions, or during drilling of non-vertical holes (angle drilling). This can result in traditional positioning systems failing to adequately capture the drill pipe. Similarly, traditional systems may have difficulty capturing or handling bent drill pipes or pipes that are otherwise out of a desired alignment with the mast and/or end effectors.

Existing traditional systems also face challenges with pipe size adaptability. Such traditional systems may require different holders (differently shaped and/or sized end effectors) be added or swapped for various pipe sizes, necessitating time-consuming component changes when switching between pipe sizes, which can be available in a plurality of diameters.

The system of the present application provides a less complex and more adaptable solution that can address the above challenges and improves drill pipe handling including capture and positioning of the drill pipe 103 of FIGS. 7A and 7B within the mast 102 (FIG. 1). In particular, and now referring to FIGS. 7A and 7B, portions of the system 100 are shown supporting, capturing and positioning the drill pipe 103 adjacent the pipe flats 103A. FIGS. 7A and 7B show the first arm assembly 110A and the second arm assembly 110B. As discussed previously the first arm assembly 110A can include the first linkage 112A, the first position adjustment mechanism 114A, the plurality of shims 116 and the first end effector 118A. The second arm assembly 110B can include the second linkage 112B, the second position adjustment mechanism 114B, the plurality of shims 116 and the second end effector 118B. The first end effector 118A can include one or more of the first ramp feature 122A, the second ramp feature 122AA and the first elongate finger 120A. The second end effector 118B can include one or more of the third ramp feature 122B, the fourth ramp feature 122BB and the second elongate finger 120B.

In operation, the first position adjustment mechanism 114A and the second position adjustment mechanism 114B can be configured to receive the plurality of shims 116 (see FIG. 1 but removed in FIGS. 7A and 7B to accommodate a 6 inch diameter drill pipe 103) to adjust the position of the first end effector 118A and the second end effector 118B relative to the drill pipe 103. Using the plurality of shims 116, (here removed but insertable and removable as desired based upon the diameter of the drill pipe 103) the first end effector 118A and the second end effector 118B need not be removed or altered in shape with changes in the diameter of the drill pipe 103. Additionally, the plurality of shims 116 (FIG. 1) can be provided with precise thicknesses corresponding to different diameter increments for the drill pipe 103. Additionally, some shims of the plurality of shims 116 (FIG. 1) can be provided with a relatively smaller thickness to account for tolerances and other system modifications. Thus, use of the plurality of shims 116 (FIG. 1), allows for more precise adjustment of the first end effector 118A and the second end effector 118B relative to the drill pipe 103. This adaptability allows the system 100 can handle various pipe diameters without the need to change the end effectors, thereby reducing downtime and increasing operational efficiency.

Additionally, the shape of the receptacle 124 formed by the first end effector 118A and the second end effector 118B can better accommodate (e.g., better capture) bent drill pipes and can better account and can better account for drill pipes which are not in the desired position due to various operational conditions. This is due to in part to the shape of the receptacle 124 including portions formed by the first elongate finger 120A and the second elongate finger 120B. In particular, the first elongate finger 120A does not include a curvature along the inner edge 126A (FIG. 3) and the chamfer 128A (FIG. 3) but instead extends outward in a generally straight-line manner from the first curved member 130A. This configuration provides for the first end effector 118A with extra reach to capture the drill pipe 103 when the first end effector 118A is used in tandem with the second end effector 118B. Similarly, the second elongate finger 120B can have a same configuration as the first elongate finger 120A but a mirror symmetry and converging positioning relative thereto. Together the first end effector 118A and the second end effector 118B converge and are shaped (having non-curved portions of the inner edge) to form a wedge or dual ramp configuration that allows the first end effector 118A and the second end effector 118B to reach out, capture and force the drill pipe 103 back into the receptacle 124. This configuration improves capture of the drill pipe 103 and allows that drill pipe 103 to be captured and properly aligned, even in the presence of environmental factors such as wind or when dealing with bent pipes. The converging arrangement of the first elongate finger 102A in combination with the second elongate finger 102B improves capture of the drill pipe 103, preventing the drill pipe 103 from escaping and providing a more consistent alignment with the drill string. Put another way, the first elongate finger 102A and the second elongate finger 102B are configured (positioned, shaped, sized) to capture the drill pipe and pull the drill pipe into a desired location (e.g., positioned within the receptacle 124).

Additionally, the present system 100 better accounts for the pipe flats 103A to reduce instances of snagging or damage to the first end effector 118A and the second end effector 118B. In particular, the first end effector 118A can utilize the first ramp feature 122A, the second ramp feature 122AA, the third ramp feature 122B and the fourth ramp feature 122BB for capture of the drill pipe 103 adjacent the pipe flats 103A without snagging. As discussed and previously shown in FIG. 2B, for example, the first ramp feature 122A, the second ramp feature 122AA, the third ramp feature 122B and the fourth ramp feature 122BB can be configured as the first curved member 130A, the second curved member 130AA, the third curved member 130B and the fourth curved member 130BB having unique arcuate shape that does not allow for snagging on edges of the drill pipe 103 adjacent the pipe flats 103A. In particular, these curved members have ends that are positioned well away and outside of the inner edge 126A and the second inner edge 126B such that ends cannot come into contact with edge of the pipe flats 103A. Additionally, the first elongate finger 120A forms an end of the first end effector 118A and is designed to engage the drill pipe 103 along the chamfer 128A (FIGS. 3 and 4). The second elongate finger 120B can include a similar chamfer. The chamfer 128A helps to mitigate the risk of snagging on the pipe flats 103A (FIGS. 1, 7A and 7B) during operation as it forms a small ramp along the inner edge 126A. As shown in FIGS. 7A and 7B, the first ramp feature 122A and the second ramp feature 122AA are positioned inward of the first elongate finger 120A and the third ramp feature 122B and fourth ramp feature 122BB are positioned inward of the second elongate finger 120B. The first ramp feature 122A, the second ramp feature 122AA, the third ramp feature 122B and the fourth ramp feature 122BB and are configured to guide the drill pipe 103 into the receptacle 124 without snagging. Thus, the first ramp feature 122A, the second ramp feature 122AA, the third ramp feature 122B and the fourth ramp feature 122BB are configured (sized, shaped and positioned relative to one another) to keep the pipe flat(s) 103A from getting hung up on a flat portion of the first end effector 118A and/or the second end effector 118B. Since the drill pipe can be rotating as it passes through the first ramp feature 122A, the second ramp feature 122AA, the third ramp feature 122B and the fourth ramp feature 122BB, the first ramp feature 122A, the second ramp feature 122AA, the third ramp feature 122B and the fourth ramp feature 122BB are spaced to prevent the pipe flat(s) 103A from being repositioned due to rotation to get snagged on the first end effector 118A and/or the second end effector 118B. The length of the strips also keeps the pipe centered as the flats pass through positioner The above detailed description is intended to be illustrative, and not restrictive. The scope of the disclosure should, therefore, be determined with references to the appended claims, along with the full scope of equivalents to which such claims are entitled.

What is claimed is:

1. A system for capturing and aligning a drill pipe of a surface drill, comprising:

a first arm assembly having a first end effector coupled to a first position adjustment mechanism, wherein the first position adjustment mechanism is configured to receive a plurality of shims to adjust a position of the first end effector relative to the drill pipe, wherein the first end effector includes at least a first ramp feature and a first elongate finger forming an end of the first end effector, a first curved member of the first ramp feature adjacent to and extending above and below the first elongate finger; and a second arm assembly having a second end effector coupled to a second position adjustment mechanism, wherein the second position adjustment mechanism is configured to receive the plurality of shims to adjust a position of the second end effector relative to the drill pipe, wherein the second end effector includes at least a second ramp feature and a second elongate finger forming an end of the second end effector;

wherein the first arm assembly and the second arm assembly are configured to be arranged at an obtuse angle to one another about the drill pipe such that the first end effector and the second end effector form a receptacle for the drill pipe, wherein the receptacle is partially formed by the first elongate finger and the second elongate finger, and the first ramp feature and the second ramp feature are configured to guide the drill pipe into the receptacle.

2. The system of claim 1, wherein the first elongate finger converges toward but is spaced from the second elongate finger, and wherein the first elongate finger forms an angle of between about 30 and about 80 degrees with the second elongate finger.

3. The system of claim 1, wherein the at least the first ramp feature includes a second curved member, wherein the first end effector forms an inner edge that has an arcuate curvature and extends between and spaces apart the first curved member and the second curved member, wherein the first curved member and the second curved member each have an intermediate portion that forms a part of the inner edge and each include first and second ends positioned outward of the inner edge, wherein the at least the second ramp feature includes a third curved member and a fourth curved member, wherein the second end effector forms an second inner edge that has an arcuate curvature and extends between and spaces apart the third curved member and the fourth curved member, wherein the third curved member and the fourth curved member each have an intermediate portion that forms a part of the second inner edge and each include first and second ends positioned outward of the second inner edge.

4. The system of claim 3, wherein the second curved member is positioned at a second end of the first end effector opposite the first elongate finger, and wherein the fourth curved member is positioned at a second end of the second end effector opposite the second elongate finger.

5. The system of claim 4, wherein the third curved member is positioned adjacent the second elongate finger, and wherein the first end effector and the second end effector are arranged with a mirror symmetry about the drill pipe and are configured engage the drill pipe around at least 240 degrees of a circumference thereof.

6. The system of claim 5, wherein the first arm assembly and the second arm assembly are arranged at an angle between about 100 degrees and about 140 degrees relative to one another, wherein the first curved member is positioned at an angle of between about 95 degrees and about 145 degrees with the second curved member, and wherein the third curved member is positioned at an angle of between about 95 degrees and about 145 degrees with the fourth curved member.

7. The system of claim 5, wherein the first end effector has a chamfer extending along at least a portion of the inner edge thereof and the second end effector has a chamfer extending along at least a portion of the second inner edge thereof.

8. The system of claim 1, wherein the first arm assembly further includes a first linkage coupled to the first position adjustment mechanism at an end thereof, the first linkage pivotally connected with a first actuation mechanism and pivotally connected to a mast at two separate spaced connections therealong, wherein the second arm assembly further includes a second linkage coupled to the second position adjustment mechanism at an end thereof, the second linkage pivotally connected to a second actuation mechanism and pivotally connected to the mast at two separate spaced connections therealong.

9. A method of capturing and positioning a drill pipe of a surface drill, comprising:

positioning a first arm assembly and a second arm assembly on a mast about the drill pipe;

actuating the first arm assembly and the second arm assembly upward and inward;

engaging the drill pipe with a first elongate finger of a first end effector of the first arm assembly and a second elongate finger of a second end effector of the second arm assembly;

guiding the drill pipe along at least a first ramp feature of the first end effector positioned inward of the first elongate finger, wherein a first curved member of the first ramp feature is adjacent to and extends above and below the first elongate finger;

guiding the drill pipe along at least a second ramp feature of the second end effector positioned inward of the second elongate finger; and capturing the drill pipe in a receptacle formed by the first end effector and the second end effector.

10. The method of claim 9, further comprising adjusting a position of the first end effector and the second end effector using one or more of a plurality of shims based on a diameter of the drill pipe.

11. The method of claim 9, wherein engaging the drill pipe with the first elongate finger of the first end effector of the first arm assembly and the second elongate finger of the second end effector of the second arm assembly includes engaging the drill pipe along a chamfered edge of the first elongate finger and along a chamfered edge of the second elongate finger.

12. The method of claim 9, wherein engaging the drill pipe with the first elongate finger of the first end effector of the first arm assembly and the second elongate finger of the second end effector of the second arm assembly includes engaging the drill pipe with the first elongate finger and the second elongate finger before a full articulation of the first arm assembly and the second arm assembly upward and inward and prior to guiding the drill pipe along at least the first ramp feature and guiding the drill pipe along at least the second ramp feature.

13. The method of claim 9, wherein capturing the drill pipe in the receptacle includes engaging at least 240 degrees of a circumference of the drill pipe, and further comprising accommodating a misalignment of the drill pipe relative to the mast through a converging arrangement of the first elongate finger with the second elongate finger and a mirror symmetry of the first end effector and the second end effector.

14. The method of claim 13, wherein guiding the drill pipe along the at least the first ramp feature includes engaging the drill pipe with at least a first curved member and a second curved member of the first end effector, wherein the first curved member is positioned at an angle of between about 95 degrees and about 145 degrees with the second curved member, and wherein guiding the drill pipe along the at least the second ramp feature includes engaging the drill pipe with at least a third curved member and a fourth curved member of the second end effector, wherein the third curved member is positioned at an angle of between about 95 degrees and about 145 degrees with the fourth curved member.

15. An assembly for capturing and positioning a drill pipe of a surface drill, comprising:

a base;

an actuation mechanism pivotally coupled to the base;

a first arm assembly comprising:

a linkage pivotally coupled to the actuation mechanism, a position adjustment mechanism coupled to the linkage and configured to receive a plurality of shims, and an end effector coupled to the position adjustment mechanism and positioned relative to the drill pipe thereby, wherein the end effector includes at least a first curved member and a second curved member configured to act as ramps upon engagement with the drill pipe, wherein the end effector includes an elongate finger which the first curved member is adjacent to, wherein the first curved member extends above and below the finger, wherein the end effector forms an inner edge that has an arcuate curvature and extends between and spaces apart the first curved member and the second curved member, and wherein the first and second curved members are configured to guide the drill pipe into a receptable formed by the finger and a second finger of a second end effector of a second arm assembly.

16. The assembly of claim 15, wherein the end effector includes an elongate finger extending outward of the second curved member, and wherein the elongate finger forms an end of the end effector.

17. The assembly of claim 16, wherein the end effector has a chamfer extending along at least a portion of the inner edge thereof including along at least a portion of the elongate finger.

18. The assembly of claim 17, wherein the first curved member is positioned at an angle of between about 95 degrees and about 145 degrees with the second curved member, and wherein the first curved member and the second curved members each have an intermediate portion that forms a part of the inner edge and each include first and second ends positioned outward of the inner edge.

19. The assembly of claim 18, wherein the second curved member is positioned at a second end of the end effector opposite the elongate finger.

20. The assembly of claim 15, wherein the linkage include two substantially parallel plates, wherein the actuation mechanism is pivotally coupled to the linkage between the two substantially parallel plates.

* * * * *